United States Patent [19]
Hoover et al.

[11] Patent Number: 5,877,244
[45] Date of Patent: *Mar. 2, 1999

[54] LATEX RUBBER ADDITIVE AND LATEX RUBBER COMPOUNDS

[75] Inventors: James W. Hoover, Akron; Maurice E. Wheeler, Ashtabula, both of Ohio; James V. Fusco, Red Bank, N.J.; Harvey L. Kaufman, Hudson, Ohio

[73] Assignee: Flow Polymers, Inc., Cleveland, Ohio

[ * ] Notice: The term of this patent shall not extend beyond the expiration date of Pat. No. 5,650,454.

[21] Appl. No.: 876,089

[22] Filed: Jun. 13, 1997

Related U.S. Application Data

[63] Continuation-in-part of Ser. No. 518,236, Aug. 23, 1995, Pat. No. 5,650,454.

[51] Int. Cl.⁶ .................................................... C08K 5/09
[52] U.S. Cl. ............................................ 524/322; 524/394
[58] Field of Search ..................................... 524/322, 394

[56] References Cited

U.S. PATENT DOCUMENTS

| | | | |
|---|---|---|---|
| 3,617,377 | 11/1971 | Funabashi-shi et al. | 428/368 |
| 3,892,700 | 7/1975 | Burke, Jr. | 524/47 |
| 3,971,746 | 7/1976 | Hirai et al. | 524/322 |
| 4,005,040 | 1/1977 | Maher | 527/312 |
| 4,008,095 | 2/1977 | Fukushima et al. | 106/235 |
| 4,079,025 | 3/1978 | Young et al. | 525/54.3 |
| 4,133,932 | 1/1979 | Peck | 428/323 |
| 4,327,002 | 4/1982 | Feldman | 524/114 |
| 4,505,847 | 3/1985 | Jackson | 252/511 |
| 4,639,487 | 1/1987 | Hazelton et al. | 524/425 |
| 4,845,145 | 7/1989 | Hazelton et al. | 524/426 |
| 4,851,468 | 7/1989 | Hazelton et al. | 524/519 |
| 5,009,648 | 4/1991 | Aronoff et al. | 604/332 |
| 5,019,610 | 5/1991 | Sitz et al. | 524/61 |
| 5,021,476 | 6/1991 | Pinomaa | 524/77 |
| 5,128,392 | 7/1992 | DeTrano et al. | 523/166 |
| 5,444,121 | 8/1995 | Grennes et al. | 525/89 |

OTHER PUBLICATIONS

The Vanderbilt Rubber Handbook, 13th Ed., Robert F. Ohm, Editor, (R.T. Vanderbilt Company, Inc., Norwalk, CT, 1990) pp. 387–389.

Rubber World Magazine's 1991 Blue Book, Don R. Smith, Ed., (Lippincott & Peto Inc., Akron, OH, 1991) pp. 72–73.

*Primary Examiner*—Peter D. Mulcahy
*Attorney, Agent, or Firm*—Pearne, Gordon, McCoy & Granger LLP

[57] ABSTRACT

An additive for latex rubber compounds is provided, the additive comprising crosslinked fatty acid and preferably lightweight microcellular filler, preferably expanded perlite. The additive is prepared as an aqueous emulsion and increases tear resistance in latex rubber compounds.

14 Claims, No Drawings

LATEX RUBBER ADDITIVE AND LATEX RUBBER COMPOUNDS

This application is a continuation-in-part of U.S. patent application Ser. No. 08/518,236, filed Aug. 23, 1995 U.S. Pat. No 5,650,454.

BACKGROUND OF THE INVENTION

The present invention relates generally to latex rubber additives and more particularly to latex rubber additives which improve tear resistance and other properties when added to latex rubbers and latex rubber compounds.

DESCRIPTION OF RELATED ART

The ingredients used in latex rubber compounding may be divided into three general classifications: surface active agents, liquid phase modifiers, and elastomer phase modifiers. These ingredients are added into the latex composition to obtain desired properties such as compatibility, viscosity control, and final physical properties. The compound's final or vulcanized physical properties such as modulus, elongation, and tensile strength will for the most part determine the durability of the latex product. Although latex rubber can be formulated to possess excellent tensile strength, it is very susceptible to tear propagation or tear growth resulting in failure of the product. There is a need for a latex rubber additive which is effective in increasing tear resistance in latex rubber compounds.

SUMMARY OF THE INVENTION

A composition for use as a latex rubber additive is provided, comprising crosslinked fatty acid and a carrier, the carrier being a polar solvent in combination with one or more of the members of the group consisting of emulsifiers and wetting agents.

DETAILED DESCRIPTION OF THE PREFERRED EMBODIMENTS OF THE INVENTION

Percentages are weight percent unless otherwise specified or indicated. Parts are parts by weight.

The invention includes crosslinked fatty acid. The fatty acid to be used in making the crosslinked fatty acid is preferably unsaturated or primarily or substantially unsaturated vegetable oil fatty acid, preferably soya fatty acid, less preferably the fatty acid from rapeseed oil and linseed oil. The preferred fatty acid is soya fatty acid available from the Humko Chemical Division of Witco Corp., Memphis, Tenn., as Industrene 226. Industrene 226 has a titer of 26° C. maximum, an iodine value of 125–135, an acid value of 195–203, a saponification value of 195–204, a 2% maximum unsaponifiable matter, and a typical composition of 12% palmitic acid, 4.5% stearic acid, 23.5% oleic acid, 54% linoleic acid, and 6% linolenic acid. Less preferred soya fatty acids (fatty acids derived from soybean oil) are Industrene 126, 130, 224, and 225, which contain 7–18% palmitic acid, 2.5–9% stearic acid, 23–33% oleic acid, 33–56% linoleic acid, and 5–20% linolenic acid.

The fatty acid is crosslinked, preferably using peroxide, (although other crosslinking methods may be used) preferably organic peroxide, more preferably a high temperature decomposition peroxide—one which has a decomposition or crosslinking temperature above 240° F., preferably one which has a 1 hour half life temperature between 240°F. and 300° F. A preferred peroxide is DI-CUP 40C, which is, on a weight percent basis, 38.8% dicumyl peroxide, supported on precipitated calcium carbonate (60 weight %), with 1.2% cumene. It has active oxygen of about 5.9% and a 1 hour half life temperature of 275° F. It is available from Hercules Incorporated, Wilmington, Del. 19894. An alternative peroxide is Luperco 231-XL, from Atochem North America, Inc., Buffalo, N.Y. 14240, which is 1,1-di(t-butylperoxy)-3,3,5-trimethylcyclohexane, which is about 40% peroxide, 60% filler or diluent, having an active oxygen of about 4.2% and a recommended cure temperature of 280°–360° F.

Preferably a coagent is used with the peroxide to help stabilize the crosslinking reaction among the fatty acid molecules and increase the crosslink density. A preferred coagent is trimethylolpropane trimethacrylate, available from Sartomer Company, Inc., Exton, Pa. 19341, as SR350. Alternative coagents include ethylene dimethacrylate, triethylene glycol dimethacrylate, ethylene glycol dimethacrylate, tetraethylene glycol dimethacrylate, polyethylene glycol(200) dimethacrylate, diethylene glycol dimethacrylate, 1,3-butylene glycol dimethacrylate, and any crosslinking monomer that increases the reaction rate, such as Saret 500, 515, 516, 517, and 518 from Sartomer Company, Inc. Other suitable coagents are known in the art, such as triallylcyanurates. Coagents are preferably added at a rate of about 0.2 to 2 parts per 1 part peroxide (100% peroxide basis). A sufficient amount of peroxide and optionally coagent is used to effectively crosslink the fatty acid.

Optionally an antioxidant or antidegradent may be added to protect against oxidation or degradation of the crosslinked fatty acid; preferably this component is BHT, less preferably AgeRite Stalite octylated diphenylamines, from R. T. Vanderbilt or other known antioxidants.

In making the crosslinked fatty acid component, the formulation is preferably as follows.

|    |             | Preferred Weight % | Less Preferred Weight % | Less Preferred Weight % |
| -- | ----------- | ------------------ | ----------------------- | ----------------------- |
| 1. | Fatty acid  | 4.25               | 80–97                   | 60–99                   |
| 2. | Peroxide    | 3.25               | 2–7                     | 1–10                    |
| 3. | Coagent     | 1.5                | 1–3                     | 0.5–5                   |
| 4. | Antioxidant | 1.0                | 0.7–3                   | 0.3–5                   |

The reaction of the fatty acid to form the crosslinked fatty acid is as follows. The fatty acid is charged to a heated mixing reactor, preferably stainless steel, and brought to a processing temperature of 325–400, more preferably 350–375, °F. The peroxide and coagent are then added and the batch is reacted for 1.5 to 2 hours, at which time an acid value test is performed on the batch to determine the degree of crosslinking that has taken place; the acid value number is preferably 170–190, more preferably 170–185, more preferably 175–180. When the reaction is complete, the antioxidant is then inducted into the batch and is allowed to mix 15 minutes. The batch is then discharged from the reactor and cooled in steel containers at room temperature.

The crosslinked fatty acid produced as above is carried into the latex rubber formulation by means of a carrier with which the crosslinked fatty acid is combined. The carrier is mixable, preferably miscible, with the latex rubber composition or compound and assists in dispersing the crosslinked fatty acid therein. The carrier is preferably water or other polar solvent in combination with the emulsifier(s) and/or wetting agent(s). The carrier is preferably water, less preferably water/alcohol, less preferably alcohol, less preferably non-water, non-alcohol polar solvent in combination with effective amounts of one or more emulsifiers and/or one or more wetting agents effective or suitable to emulsify the crosslinked fatty acid component or make the crosslinked fatty acid component water-wettable, the emulsifiers and wetting agents preferably being those known in the art as useful for latex rubber compounding, such as those listed in Rubber World Magazine's *Blue Book*. Wetting agents may also be referred to as surface active agents. The preferred emulsifiers and/or wetting agents are sodium lignosulfonate, available as Darvan No. 2 from R. T. Vanderbilt Co. and triethanolamine, available as 85% triethanolamine from Sealand Chemical Co. (this latter component also is helpful in increasing the pH of the composition). It is preferable to also add isopropyl alcohol (or less preferably methyl alcohol) as a wetting agent and compound stabilizer.

Less preferred emulsifiers and/or wetting agents include polyethylene glycol, available as Pegosperse 200DL from Lonza, 5 Inc., sodium dodecyl diphenyl oxide disulfonate, available as Calfax DB-45 from Pilot Chemical, ethoxylated hydrogenated natural fatty alcohol, such as Natralube 168 from The Fanning Corp., Chicago, and a solution of polymerized alkyl phosphate, such as Rheotol from R. T. Vanderbilt. Other emulsifiers and/or wetting agents known in the art such as the Triton compounds may be used, as well as the emulsifiers and wetting agents listed in Rubber World Magazine's *Blue Book*. The polar solvent is preferably at least 90% water, more preferably 100% water. Preferably there are about 60 parts water to about 0.03–5, more preferably 0.5–2, parts emulsifier and wetting agent. To produce the carrier, the water is combined with the emulsifiers and/or wetting agents in a mixing vessel and mixed for one to two minutes at low speed. The crosslinked fatty acid produced as described above is then added to the carrier and mixed for 4 minutes at low speed to provide the emulsified latex rubber additive liquid emulsion.

In making the latex rubber additive, the formulation is preferably as follows.

| Composition No. 1 | Preferred Parts by Weight | Less Preferred Parts by Weight | Less Preferred Parts by Weight |
|---|---|---|---|
| 1. Crosslinked fatty acid | 30.0 | 22–50 | 15–75 |
| 2. Polar solvent | 63.8 | 40–70 | 20–80 |
| 3. Emulsifier No. 1 | 0.1 | 0.07–0.3 | 0.05–0.5 |
| 4. Emulsifier No. 2 | 1.0 | 0.6–2.0 | 0.25–3.0 |
| 5. Isopropyl alcohol | 0.1 | 0.07–0.3 | 0.05–0.5 |

Ingredient No. 1 is preferably the crosslinked fatty acid produced as described above. The polar solvent is preferably 100% water. Emulsifier No. 1 is preferably Darvan No. 2. Emulsifier No. 2 is preferably 85% triethanolamine (85% TEA). The isopropyl alcohol is preferably 70% isopropyl alcohol.

To combine Ingredients 1–5, in a high speed laboratory blender, ingredients 2 and 3 are added and mixed for a period of 30 seconds at low speed. Ingredients 4 and 5 are then added and mixed for 1 minute at low speed. The crosslinked fatty acid is then added and mixed for 4 minutes at low speed. The pH of the resulting liquid emulsion is preferably about 5 to about 7, more preferably about 6–6.5. The pH may be adjusted by adding ammonium hydroxide or other similar pH adjuster. Preferably, the Brookfield Viscosity (#6 spindle, 20 rpm @ 25° C.) of the invented emulsion is preferably 400–2,000, more preferably 450–1,500, more preferably 600–1,000, cps. The percent solids is preferably 30–45%, more preferably 34–37%.

More preferably, Composition No. 1 above has added thereto 5, less preferably 3–10, less preferably 1–15, parts by weight lightweight microcellular filler, preferably expanded perlite, such as Sil-cell 35/34 from Silbrico Corp. Sil-cell expanded perlite is a glass microcellular material of hollow glass particles of multiple cells (each particle is a cluster of microbubbles) whose shapes vary to combine different geometries, spherical and irregular. It has an effective specific gravity of 0.25, a particle density or effective particle density of 0.25 g/cm$^3$, an average particle size of 35 microns, a particle size range of 1–150 microns, and a typical particle size distribution (by weight %) of U.S. Sieve +50 mesh: 0; –50+100: trace; –100 +200: 12%; –200: 88%. The lightweight microcellular filler preferably has a particle density less than about 0.5, more preferably less than about 0.4, more preferably between 0.07 and 0.3, g/cm$^3$. Less preferably the lightweight microcellular filler is hollow glass microspheres, such as Scotchlite glass bubbles from 3M Company, such as Scotchlite Product K1, which has an average particle density of 0.125 g/cm$^3$. Hollow plastic microspheres which will not melt or soften and collapse or deform at the latex rubber processing and curing temperatures encountered (typically 275–325° F.) may also be used. The term lightweight microcellular filler includes such expanded perlite, hollow glass microspheres and hollow plastic microspheres. Alternatively, it is believed that fumed silica, such as Cab-O-Sil M-5 fumed silica from Cabot Corp., may be substituted for the expanded perlite or hollow glass microspheres. The lightweight filler material is lightweight so that it resists settling out or separating from the emulsion.

Preferably the lightweight microcellular filler is added to Composition No. 1 by being added after Emulsifier No. 1 and mixed for 2–3 minutes at low speed.

The invented latex rubber additive is an emulsion and is suitable for being combined with natural or synthetic latex rubber emulsions or compounds, including acrylic latexes, natural rubber latexes, nitrile latexes, polychloroprene latexes, styrene-butadiene latexes, and vinyl pyridine latexes to improve tear resistance, tensile strength, and other properties and/or characteristics in such things as latex rubber goods such as latex rubber gloves and condoms.

The invented additive is added to the latex rubber formulation in an amount effective to increase tear resistance, preferably at a rate of about 1.45, less preferably about 0.9–3, less preferably about 0.3–6, parts crosslinked fatty acid per hundred parts rubber. If lightweight microcellular filler is included in the additive, preferably there is 1–15, more preferably 3–10, more preferably 4–7, more preferably about 5, parts lightweight microcellular filler per 30 parts crosslinked fatty acid.

The following Examples further illustrate various aspects of the invention. Unless otherwise indicated, the ingredients are combined using methods known in the art or as described above.

EXAMPLE 1

Additive preparation. A crosslinked fatty acid (Sample 1) was prepared by heating 95.25 parts Industrene 226 and 1.5 parts SR350 to 350°–375° F., adding 3.25 parts Dicup 40-C and reacting for 1.5 hours. The acid value was then measured at 177–186. Latex rubber additives (Samples 2–4) were then prepared as follows (parts by weight).

| Ingredient | Sample 2 | Sample 3 | Sample 4 |
|---|---|---|---|
| 1. Sample 1 | 59.9 | 40.0 | 59.9 |
| 2. Water | 39.88 | 58.84 | 39.94 |
| 3. Darvan No. 2 | 0.10 | 0.10 | 0.10 |
| 4. 29% Ammonia hydroxide | 0.06 | 0 | 0 |
| 5. 70% isopropyl alcohol | 0.06 | 0.06 | 0.06 |
| 6. 85% TEA | 0 | 1.0 | 0 |

Samples 2–4 were mixed by blending Ingredients 2–6 in a lab blender on lowest speed for 2 minutes. Sample 1 was then added and mixed on lowest speed for 5 minutes. Effectively emulsified additives were produced. Samples 2–4 had a pH of 5.5, 6.89, and 4.78 respectively, a Brookfield viscosity at 23° C. (using #3 spindle at 10 PRM, except Sample 3-#2 spindle at 50 RPM) of 7933 cp., 532 cp., and 5467 cp., respectively, and % volatiles (2 hrs. at 220° F.) of 27.1%, 39.8%, and 27.4%, respectively.

A nitrile rubber latex formulation was prepared as a control and identified as Sample 5. Sample 5 consisted of 207.8 parts nitrile latex from Ansell-Edmont (which is 49% solids), 3.76 parts 10% KOH solution from Akron Dispersions, 2.36 parts BC21–1 (a 74% sulfur dispersion from Akron Dispersions), 1.86 parts Bostex 533-B, a 50% mercaptobenzothiazole from Akron Dispersions, 7.94 parts 60% ZnO dispersion from R. T. Vanderbilt, and 1.04 parts CPB dibutyl xanthogen disulfide from Uniroyal Chemical. This formulation has 100 parts rubber. The mixing procedure was as follows. The components were added slowly to the stirred latex at room temperature in the order listed above. After the ZnO dispersion was added, the compound was aged for 24 hours at room temperature before adding the CPB emulsion. Two hours after the CPB emulsion was mixed into the batch, the additives (if any) to be added (see below) were added, and the batch was again aged for another 24 hours.

Samples 6, 7, and 8 were then prepared by adding to the Control (Sample 5) five parts of Samples 2, 3 and 4, respectively, per hundred parts rubber in Sample 5. (Eg., Sample 6 was made by adding to Sample 5 five parts of Sample 2 per hundred parts rubber in Sample 5). Samples 5–8 were then dipped, cured, and tested as follows.

Dipping and Curing Method Utilized. A clean ceramic dipping test form (3×4 inches) was submerged into a water coagulant comprised of 20% ethyl alcohol solution of calcium nitrite for a period of one minute and let dry at room temperature. The form was dipped into the latex formulation to be tested for 45 seconds. The form was rotated for one minute, removing drips that formed on the end of the form. The dipped form was put into a cold water leech for 20 minutes to remove residual salts or nitrates. The dipped form was then dried for 20 minutes at 180° F. The dipped form was then cured for 45 minutes at 280°F. in a forced air oven. The form was cooled for 24 hours before testing. The vulcanized latex form was removed and the sides were cut, forming a rectangular testing sheet. The testing sheet was then tested.

After dipping the forms Sample 5 developed large tears down the middle of the latex form during the drying stage. Samples 6–8 did not demonstrate this phenomenon even after curing.

| | 300% Modulus (psi) | % Elongation at Break | Tensile Strength (psi) | Die C Tear (psi) |
|---|---|---|---|---|
| Sample 5 | 1990 | 369 | 3526 | 197 |
| Sample 6 | 2001 | 433 | 4391 | 258 |
| Sample 7 | 2002 | 441 | 4640 | 245 |
| Sample 8 | 2024 | 430 | 4496 | 236 |

It can be seen that the addition of a latex rubber emulsion additive containing crosslinked fatty acid to the control nitrite rubber latex formulation resulted in increases in elongation, tensile strength, and tear resistance, particularly the additive of Sample 3 used in Sample 7.

EXAMPLE 2

Additive preparation. A crosslinked fatty acid (Sample 9) was prepared by reacting 94.25 parts Industrene 226, 3.25 parts Dicup 40-C, 1.5 parts SR350 and 1 part BHT in accordance with the procedure described above, the acid value being about 179.

Thirty parts of Sample 9, 63.8 parts water, 0.1 parts Darvan No. 2, 1 part 85% TEA, 0.1 parts 70% isopropyl alcohol, and 5 parts Sil-cell 35/34 were combined in accordance with the procedure described above to form aqueous emulsion Sample 10, the pH being 6.5 and the Brookfield Viscosity (#6 spindle, 20 rpm @ 25° C.) being 1300 cp.

Sample 11 is the same control nitrile rubber latex formation as Sample 5. Sample 12 is Sample 11 combined with 5 parts of Sample 10 per 100 parts rubber in Sample 11.

Samples 11–12 were then dipped, cured, and tested as described above. After the testing forms were removed from the ovens Sample 11 showed some shrinkage during the vulcanizing phase causing small slits in the testing sheet. Sample 12 did not exhibit this problem.

| | 300% Modulus (psi) | % Elongation at Break | Tensile Strength (psi) | Die C Tear (psi) |
|---|---|---|---|---|
| Sample 11 | 2100 | 390 | 3426 | 186 |
| Sample 12 | 1875 | 483 | 4888 | 251 |

The addition of a latex rubber emulsion additive containing crosslinked fatty acid and a lightweight microcellular material (expanded perlite) to the control nitrile rubber latex formulation resulted in increases in elongation, tensile strength, and tear resistance (a 35% increase in tear resistance). The invented additive is added in an amount effective to increase the Die C tear resistance (in order of increasing preference) 5%, 10%, 15%, 20%, 25%, 30% and 35% or more.

Although the preferred embodiments have been described, it is understood that various modifications and replacements of the components and methods may be resorted to without departing from the scope of the invention as disclosed and claimed herein.

What is claimed is:

1. A composition for use as a latex rubber additive in a latex rubber formulation, said composition comprising crosslinked fatty acid and a carrier, said crosslinked fatty acid being crosslinked in a separate reaction prior to incorporation into said latex rubber formulation, said carrier being a polar solvent in combination with one or more of the members of the group consisting of emulsifiers and wetting agents.

2. A composition according to claim 1, said composition further comprising lightweight microcellular filler.

3. A composition according to claim 2, wherein said polar solvent is water and said lightweight microcellular filler is expanded perlite.

4. A composition according to claim 1, said composition being an aqueous emulsion having a pH of about 5 to about 7.

5. A composition according to claim 1, wherein said fatty acid is vegetable oil fatty acid.

6. A composition according to claim 3, said composition having 1–15 parts by weight expanded perlite per 30 parts by weight crosslinked fatty acid.

7. A composition according to claim 1, said polar solvent being water, said composition having 15–75 parts by weight crosslinked fatty acid per 63.8 parts by weight water.

8. A latex rubber compound comprising a) rubber selected from the group consisting of natural latex rubbers, synthetic latex rubbers, and mixtures of any of the foregoing and b) a rubber additive, said rubber additive comprising crosslinked fatty acid, said crosslinked fatty acid being crosslinked in a separate reaction prior to incorporation into said latex rubber compound, said rubber additive being present in said latex rubber compound in an amount effective to increase the tear resistance of said latex rubber compound.

9. A latex rubber compound according to claim 8, said rubber additive further comprising lightweight microcellular filler.

10. A latex rubber compound according to claim 9, wherein said lightweight microcellular filler is expanded perlite.

11. A latex rubber compound according to claim 8, said rubber compound having about 0.3–6 parts by weight crosslinked fatty acid per 100 parts by weight rubber.

12. A latex rubber compound according to claim 9, said rubber additive being 1–15 parts by weight lightweight microcellular filler per 30 parts by weight crosslinked fatty acid.

13. A latex rubber compound according to claim 12, said rubber compound having about 0.3–6 parts by weight crosslinked fatty acid per 100 parts by weight rubber.

14. A latex rubber compound according to claim 8, said rubber additive being present in said latex rubber compound in an amount effective to increase the Die C tear resistance of said latex rubber compound at least 10%.

* * * * *

UNITED STATES PATENT AND TRADEMARK OFFICE
CERTIFICATE OF CORRECTION

PATENT NO. : 5,877,244
DATED      : March 2, 1999
INVENTOR(S): James W. Hoover, et al.

It is certified that error appears in the above-identified patent and that said Letters Patent is hereby corrected as shown below:

Column 2, line 40, delete "4.25" and insert therefor --94.25--.

Column 3, line 18, delete "Lonza, 5 Inc.," and insert therefor --Lonza, Inc.,--.

Column 6, before line 1 insert
--Testing Results (tested using ASTM Methods).--.

Column 6, after line 36 and before the table, insert "Testing Results.".

Column 6, line 43, delete "4888" and insert therefor --3888--.

Signed and Sealed this

Third Day of August, 1999

Attest:

Q. TODD DICKINSON

*Attesting Officer*       Acting Commissioner of Patents and Trademarks